United States Patent
Nishino et al.

(10) Patent No.: US 6,769,453 B2
(45) Date of Patent: Aug. 3, 2004

(54) RESIN TUBE FOR AUTOMOTIVE PIPING AND METHOD OF FABRICATING THE SAME

(75) Inventors: Ryo Nishino, Kanagawa-ken (JP); Hirozou Uejou, Kanagawa-ken (JP)

(73) Assignee: Piolax Inc., Yokohama (JP)

( * ) Notice: Subject to any disclaimer, the term of this patent is extended or adjusted under 35 U.S.C. 154(b) by 169 days.

(21) Appl. No.: 10/212,203

(22) Filed: Aug. 6, 2002

(65) Prior Publication Data

US 2003/0047228 A1 Mar. 13, 2003

(30) Foreign Application Priority Data

Aug. 7, 2001 (JP) .......................................... 2001-239778

(51) Int. Cl.[7] .............................................. F16L 11/00
(52) U.S. Cl. ....................... 138/121; 138/137; 138/141; 428/36.91
(58) Field of Search ................. 138/121, 137, 138/141; 428/36.91

(56) References Cited

U.S. PATENT DOCUMENTS

| | | | | |
|---|---|---|---|---|
| 4,410,661 A | * | 10/1983 | Epstein et al. ................. | 525/66 |
| 4,871,799 A | * | 10/1989 | Kobayashi et al. ............ | 525/64 |
| 5,362,530 A | * | 11/1994 | Kitami et al. ............... | 428/36.2 |
| 5,390,705 A | * | 2/1995 | Brunnhofer .................. | 138/137 |
| 5,476,080 A | * | 12/1995 | Brunnhofer .................. | 123/468 |
| 5,622,757 A | * | 4/1997 | Murakami et al. ........ | 428/36.91 |
| 5,648,424 A | * | 7/1997 | Miwa et al. ............... | 525/92 D |
| 5,776,570 A | * | 7/1998 | Murakami et al. ......... | 428/36.8 |
| 5,792,532 A | * | 8/1998 | Pfleger ....................... | 428/36.9 |
| 6,576,313 B2 | * | 6/2003 | Iio et al. ................... | 428/36.91 |
| 2002/0119272 A1 | * | 8/2002 | Ries et al. ............... | 428/36.91 |

* cited by examiner

*Primary Examiner*—James Hook
(74) *Attorney, Agent, or Firm*—Greenblum & Bernstein, P.L.C.

(57) ABSTRACT

Nylon 6 having viscosity number within a range of 170–340 in a measurement of a 98% concentrated sulfuric acid solution at 25° C. and a plasticizer are mixed in advance, and then the mixture is mixed with Nylon 66 having viscosity number within a range of 240–370 in the measurement, thus a resin composite is prepared. Then, the resin composite is formed into a tube by extrusion molding. The resin tube thus obtained is used as a resin tube for automotive piping, such as vapor fuel piping to be incorporated into a fuel tank or as oil piping to be incorporated into an engine room.

8 Claims, 3 Drawing Sheets

RESIN TUBE FOR AUTOMOTIVE PIPING AND METHOD OF FABRICATING THE SAME

BACKGROUND OF THE INVENTION

1. Field of the Invention

The present invention relates to various automotive piping, especially a highly heat-resistant resin tube suitable for fuel system piping for an automotive engine, and to a method of fabricating the resin tube.

2. Description of the Related Art

Various piping arrangements are provided on an automobile. Among these, some are constituted by resin tubes. Resin tubes are lightweight and easy for handling as compared to metallic tubes and rubber tubes. Further, the resin tubes also have an advantage of simple processes for connection by use of resin connectors or the like. Moreover, resin tubes tend to be low in terms of manufacturing costs as compared to metallic tubes and rubber tubes.

Nylon 11, Nylon 12 and the like are used for the resin tubes of automotive piping. These materials have an advantage of high flexibility, whereby freedom of piping shapes is brought about.

The automotive piping to be provided particularly inside an engine room is frequently exposed to high temperature. Accordingly, such piping is required to possess sufficient heat resistance and strength. In addition to heat resistance and strength, the automotive piping is required to possess oil resistance for application to oil system piping, and fuel resistance for application to fuel system piping.

For example, regarding vapor fuel piping installed inside a fuel tank, the piping after installation in the tank is exposed to a high-temperature atmosphere of about 180° C. during the painting and drying processes of the tank. Therefore, there is a problem in that the vapor fuel system piping tends to be deformed by heat.

The above-mentioned Nylon 11 and Nylon 12 do not possess adequate heat resistance or airtightness for application to fuel system piping for an automotive engine.

Meanwhile, Nylon 66 is known to be a heat-resistant material. However, since the Nylon 66 has poor moldability, it is difficult to process the Nylon 66 by means of extrusion molding and the like. Moreover, since the Nylon 66 has poor flexibility, the Nylon 66 cannot provide freedom of piping in an automobile.

SUMMARY OF THE INVENTION

The present invention has been accomplished to solve the above problem, and it is an object of the present invention to provide a highly moldable and highly heat-resistant resin tube for automotive piping and to provide a fabricating method of the resin tube.

The first aspect of the present invention provides a resin tube for automotive piping comprising: Nylon 66 having a viscosity number within a range of 240–370 in a measurement of a 98% concentrated sulfuric acid solution at 25° C.; Nylon 6 having a viscosity number within a range of 170–340 in the measurement; and a plasticizer, wherein the resin tube is made of a composite as a mixture thereof prepared with a proportion in a mass ratio of the Nylon 66:the Nylon 6:the plasticizer to be within a range of 100:5–50:3–20.

According to the first aspect of the present invention, the Nylon 66 is used as a base material, the resin tube has excellent heat resistance, fuel resistance and oil resistance. Accordingly, the resin tube is also applicable to fuel system piping for an automotive engine, for example. Addition of the Nylon 6 and the plasticizer to the Nylon 66 achieves higher flexibility in comparison with the single Nylon 66. Therefore, the addition enables use of the resin tube in piping in a small space or in piping with complicates shapes. Although it was difficult to carry out extrusion molding with the single Nylon 66, addition of the Nylon 6 and the plasticizer to the Nylon 66 makes it possible to have formation such as extrusion molding by use of a normal extruder machine. Since it is unnecessary to use special engineering plastics such as Nylon 46 or polyphenylene sulfide (PPS), material costs can be reduced as well.

The second aspect of the present invention provides the resin tube for automotive piping according to the first aspect of the present invention, wherein the resin tube is made of a composite as a mixture thereof prepared with a proportion in a mass ratio of the Nylon 66:the Nylon 6:the plasticizer to be within a range of 100:10–40:5–10.

According to the second aspect of the present invention, it is possible to impart flexibility, moldability and the like additionally to the resin tube without affecting performances thereof such as heat resistance, fuel resistance and oil resistance.

The third aspect of the present invention provides the resin tube for automotive piping according to the first aspect of the present invention, wherein the viscosity number of the Nylon 66 is within a range of 270–340.

According to the third aspect of the present invention, it is possible to impart flexibility, moldability and the like additionally to the resin tube without affecting performances thereof such as heat resistance, fuel resistance and oil resistance.

The fourth aspect of the present invention provides the resin tube for automotive piping according to the first aspect of the present invention, wherein the resin tube is formed into a straight tube.

The fifth aspect of the present invention provides the resin tube for automotive piping according to the first aspect of the present invention, wherein the resin tube is formed into a bellows.

The sixth aspect of the present invention provides the resin tube for automotive piping according to the first aspect of the present invention, wherein the resin tube is formed into a multilayer tube in combination with other resin.

The seventh aspect of the present invention provides the resin tube for automotive piping according to the first aspect of the present invention, further comprising: an additive for use in resin materials.

The eighth aspect of the present invention provides a method of fabricating a resin tube for automotive piping comprising the steps of: mixing Nylon 6 having viscosity number within a range of 170–340 in a measurement of a 98% concentrated sulfuric acid solution at 25° C., and a plasticizer; preparing a resin composite by mixing the mixture of the Nylon 6 and the plasticizer with Nylon 66 having viscosity number within a range of 240–370 in the measurement; and forming the resin composite into a tube by extrusion molding.

According to the eighth aspect of the present invention, the Nylon 6 and the plasticizer are mixed in advance and the mixture is added to the Nylon 66. Therefore, it is possible to mix the Nylon 6 and the plasticizer uniformly and easily with the Nylon 66.

Addition of the Nylon 6 and the plasticizer to the Nylon 66 effectuates easy and efficient molding of the resin tube by normal extrusion molding.

BRIEF DESCRIPTION OF THE DRAWINGS

The present invention will now be described with reference to the accompanying drawings wherein.

DETAILED DESCRIPTION OF THE PREFERRED EMBODIMENT

Figure 1:
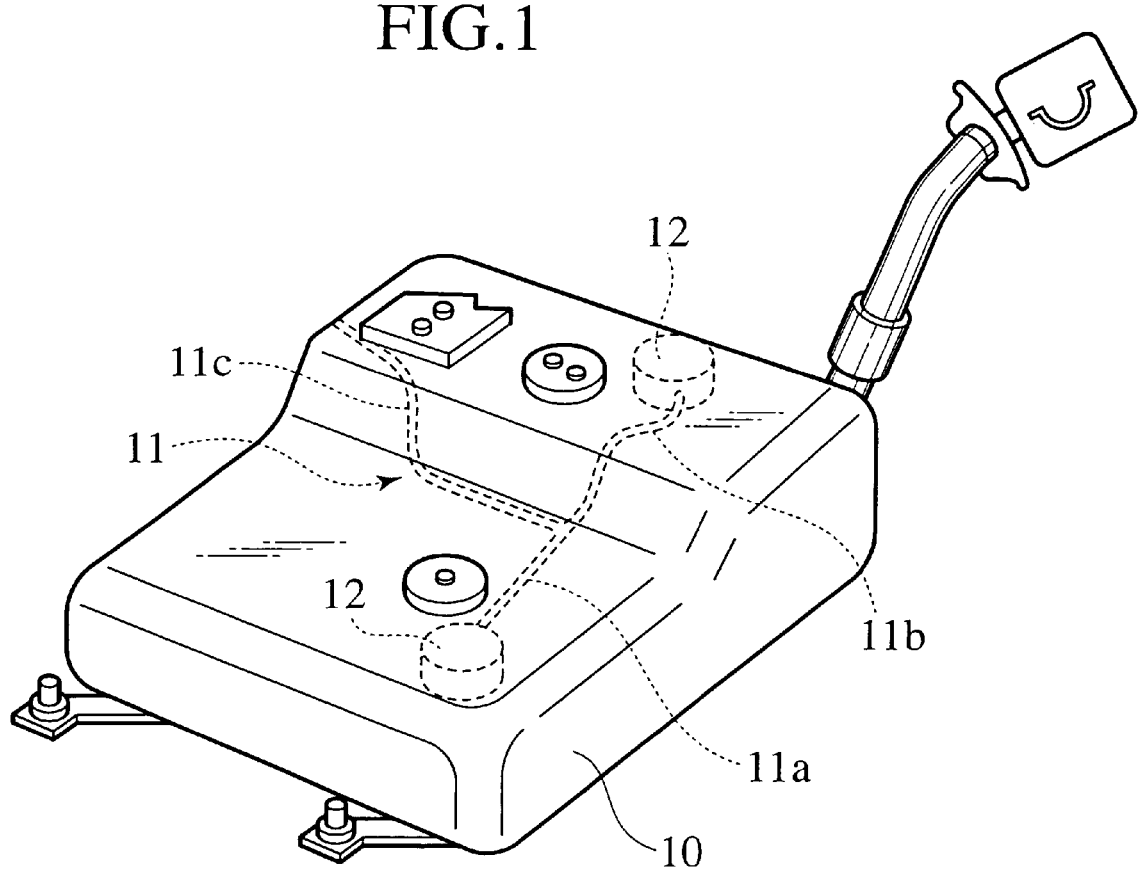
FIG. 1 shows a perspective view illustrating one example of applying a resin tube of the present invention to vapor fuel piping of a fuel tank.

To describe the present invention in more detail, preferred embodiments of the present invention will be explained with reference to the drawings below.

A resin tube for automotive piping according to the present invention is made of a resin composite containing (1) Nylon 66, (2) Nylon 6 and (3) a plasticizer.

As for the (1) Nylon 66, one having viscosity number within a range of 240–370, more preferably within a range of 270–340, in a measurement of a 98% concentrated sulfuric acid solution at 25° C. is used. The viscosity number is measured based on the Japanese Industrial Standards JIS K6920-1 and the International Standards Organization ISO 1874-1. When the viscosity number is below 240, the Nylon 66 has a problem of high fluidity in molding and is therefore unsuitable for extrusion molding. When the viscosity number exceeds 370, the Nylon 66 has a problem in that it tends to clog an extruder machine owing to cooling solidification. Such suitable Nylon 66 includes, for example, "Leona 1702X01" (trade name) made by Asahi Kasei Corp. and the like.

As for the (2) Nylon 6, one having the viscosity number within a range of 170–340, more preferably in a range of 200–320, is used. When the viscosity number of the Nylon 6 is below 170, the Nylon 6 has a problem of high fluidity in molding and is therefore unsuitable for extrusion molding. When the viscosity number of the Nylon 6 exceeds 320, there is a problem in that the Nylon 6 encourages the nature of the Nylon 66 to be apt to solidification on cooling. Such suitable Nylon 6 includes, for example, "1030B" (trade name) made by Ube Industries Ltd. and the like.

As for the (3) plasticizer, any one or a mixture of compounds selected from the group consisting of sulfonamide derivatives, sulfonate derivatives, phosphate derivatives, phosphazene derivatives, carboxamide derivatives, and carboxylic ester derivatives are preferably used, for example. These plasticizers structurally have high affinities with polyamide resin and preserve plasticity of polyamide resin composites in cold regions.

Mixing proportions of the (1) Nylon 66, the (2) Nylon 6 and the (3) plasticizer are defined as the (1) Nylon 66 at 100 parts by weight to the (2) Nylon 6 within a range between 5 and 50 parts by weight, preferably between 10 and 40 parts by weight, to the (3) plasticizer within a range between 3 and 20 parts by weight, preferably between 5 and 10 parts by weight. In this case, plasticity of a molded part cannot be obtained if the (2) Nylon 6 is below 5 parts by weight relevant to 100 parts by weight of the (1) Nylon 66, and characteristics of the Nylon 66 such as heat resistance is damaged if the Nylon 6 exceeds 50 parts by weight. The plasticity of the molded part cannot be obtained if the (3) plasticizer is below 3 parts by weight relevant to 100 parts by weight of the (1) Nylon 66, and deterioration of plasticity attributable to separation of the plasticizer is concerned in the long term if the plasticizer exceeds 20 parts by weight.

In addition to the ingredients (1) to (3), the composition of matter for use in the resin tube of the present invention may also contain various additives normally used for the resin material of this type, for example: heat resistant agents such as copper halides, hindered phenol compounds and aromatic amine; antioxidants such as phenol, thioether, phosphite and amine antioxidants; ultraviolet absorbents such as salicylate, benzophenone, benzotriazole, imidazole, oxazole, hindered amine, cyanoacrylate, metallic complex salt and phenyl salicylate; weather resistant agents such as carbon black, copper compounds, hindered amine agents and manganese oxyphosphates; antistatic agents such as alkylamine, alkylamide, alkylether, alkylphenylether, glyceride, sorbitan fatty acid ester, alkylsulfonate, alkylbenzenesulfonate, alkylsulfate, alkylphosphate, quaternary ammonium salts and alkylbetaine; inorganic flame resistant agents such as red phosphorous, tin oxide, zirconium hydroxide, barium metaborate, aluminum hydroxide and magnesium hydroxide; organic flame resistant agents such as halogenic, phosphate, and melamine or cyanurate agents; flame resistant auxiliary agents such as antimony trioxide; heat stabilizers such as hindered amine stabilizers, tin compounds and epoxy compounds; abrasion resistant agents such as molybdenum disulfide, graphite, polyethylene, polyethylene tetrafluoride and silicone; nucleator agents; mold release agents; oil solutions; pigments; dyes; and the like.

The resin tube of the present invention can be fabricated by mixing the (2) Nylon 6 and the (3) plasticizer in advance, preparing a resin composite by mixing the mixture with the (1) Nylon 66 and forming the tube by means of extrusion molding, for example. It is generally difficult to obtain a uniform mixture if the plasticizer is mixed with the Nylon 66 directly. Nevertheless, if the Nylon 6 and the plasticizer are mixed in advance and then the mixture is mixed with the Nylon 66, it is possible to mix the plasticizer with the Nylon 66 easily and uniformly.

Although methods of forming the resin tube of the present invention are not particularly limited, the tube may be formed into a straight tube by extruding the resin composite tubularly out from a die on an extruder machine and then sizing and hardening the resin composite in a vacuum cooling bath, for example. Otherwise, the tube may be also formed into a bellows by extruding the resin composite tubularly out from the die, sandwiching the periphery of the tube with a pair of rotating molds and pressing the periphery of the tube against annular grooves formed on inner surfaces of the molds by means of air blowing, vacuum molding or the like.

The resin tube of the present invention may also be a multilayer tube incorporating other resin in addition to the (1) Nylon 66, the (2) Nylon 6 and the (3) plasticizer. In this case, the other resin may include fluoroplastics, for example. In the case of the multilayer tube incorporating the other resin, the nylon resin layer may be used as an inner layer, an outer layer or a middle layer.

The resin tube of the present invention is used as a tube for automotive piping. In particular, the tube is used for vapor fuel piping incorporated into a fuel tank of an automobile or oil piping incorporated into an engine room.

FIG. 1 illustrates one example of the vapor fuel piping incorporated into the fuel tank of an automobile. Vapor fuel piping 11 is fitted to an inner surface on an upper wall of a fuel tank 10. The vapor fuel piping 11 is provided with two branch pipes 11a and 11b severally having filters 12 on end portions thereof. An outgoing pipe 11c extends from a junction of the branch pipes 11a and 11b toward the outside of the fuel tank 10. The outgoing pipe 11c is connected to a canister through unillustrated external piping.

Various instruments including the vapor fuel piping 11 are disposed inside the fuel tank 10, and then the fuel tank 10 is subjected to painting on the outer surface thereof and then to heat drying. Since the fuel tank 10 is subjected to a high temperature of some 180° C. in this event, the instruments disposed inside the fuel tank 10 must be heat-resistant.

In this context, the resin tube of the present invention is not deformed by a high temperature of some 180° C. when used in the vapor fuel piping 11, because the tube is made of the resin composite based on the Nylon 66. Accordingly, the tube can maintain its form which is bent in advance according to the internal shape of the fuel tank 10.

The resin tube of the present invention is relatively soft because the tube contains the Nylon 6 and the plasticizer in addition to the Nylon 66. Accordingly, it is readily feasible to bend the resin tube so as to conform to the inner shape of the fuel tank 10. Since the resin tube of the present invention contains the Nylon 66 and the Nylon 6, the tube has excellent fuel resistance. Therefore, the resin tube possesses sufficient long-range durability.

EXAMPLE 1

50 parts by weight of Nylon 6 ("1030J" (trade name) made by Ube Industries; viscosity number at 254), which was premixed with a plasticizer by 20 wt %, was added to and mixed with 100 parts by weight of Nylon 66 ("Leona 1702X01" (trade name) made by Asahi Kasei; viscosity number at 304), whereby a resin composite was prepared.

The resin composite was then formed into a tube with an extruder machine. The resin tube thus formed has the following dimensions of an outside diameter of 8 mm, an inside diameter of 6 mm and a wall thickness of 1 mm.

COMPARATIVE EXAMPLE 1

A resin composite based on Nylon 11 ("RILSAN BESN BK P20TL" (trade name) made by Atofina Japan) containing a plasticizer was formed into a tube with the extruder machine. A resin tube having a similar shape to Example 1 was thereby obtained.

COMPARATIVE EXAMPLE 2

Nylon 612 ("ZYTEL EFE-4168" (trade name) made by Dupont) containing a deforming agent was formed into a tube with the extruder machine. A resin tube having a similar shape to Example 1 was thereby obtained.

COMPARATIVE EXAMPLE 3

Nylon 6 ("1030J" (trade name) made by Ube Industries; viscosity number at 254) containing a plasticizer was formed into a tube with the extruder machine. A resin tube having a similar shape to Example 1 was thereby obtained.

COMPARATIVE EXAMPLE 4

The Nylon 66 ("Leona 1702X01" (trade name) made by Asahi Kasei; viscosity number at 304) was formed into a tube with the extruder machine. A resin tube having a similar shape to Example 1 was thereby obtained.

COMPARATIVE EXAMPLE 5

Nylon 66 ("AMILAN CM3001" (trade name) made by Toray Industries; viscosity number at 160) was attempted to be formed into a tube with the extruder machine. However, it could not be formed into a tube.

EXAMINATION EXAMPLE

Fabrication quality (heat bending), a bend R (a minimum bending radius), airtightness with a joint, and dimensional variation after immersion into fuel were examined regarding each of the resin tubes obtained in Example 1 and Comparative Examples 1 to 4. Methods of the respective examinations are as follows:

(1) Fabrication Quality (Flexural Rigidity)

Figure 2:
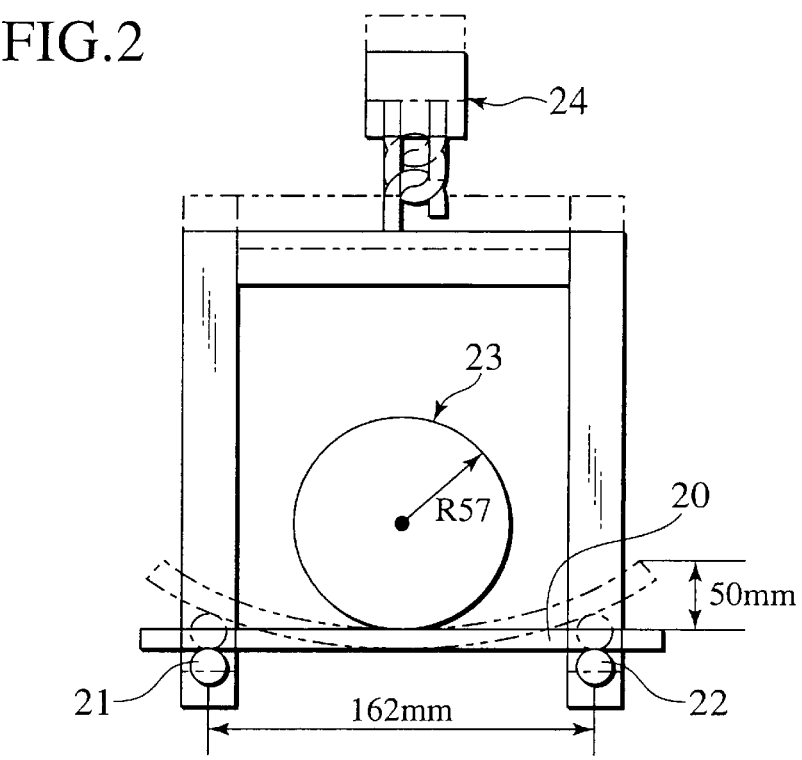
FIG. 2 shows an explanatory view illustrating a method of examining fabrication quality.

Flexural rigidity was measured at room temperature in accordance with a method as illustrated in FIG. 2. A test piece 20 obtained by cutting each of the resin tubes into a length of 280 mm was placed on a pair of shafts 21 and 22 disposed parallel with a width of 162 mm, and then the center of the test piece was pressed with a mandrel 23. A load was measured with a load cell 24 when a traveling distance of a tip of the test piece 20 reached 50 mm.

(2) Bend R (Minimum Bending Radius)

Figure 3:
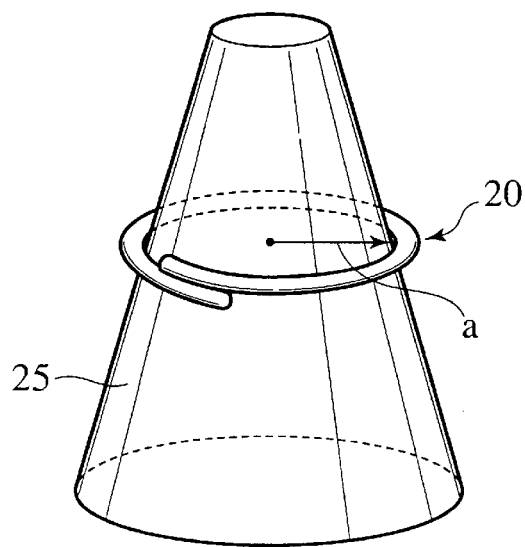
FIG. 3 shows an explanatory view illustrating a method of examining a bend R.

A minimum bending radius was measured at room temperature in accordance with a method as illustrated in FIG. 3. A test piece 20 obtained by cutting each of the resin tubes into a length of 300 mm was coiled around a cone-shaped mandrel 25 by 180° or more without applying excessive stress thereto. A minimum bending radius a, where the resin tube was coiled around the mandrel 25 without gaps and without causing coil breaks, was thereby measured.

(3) Airtightness with a Joint

Figure 4:
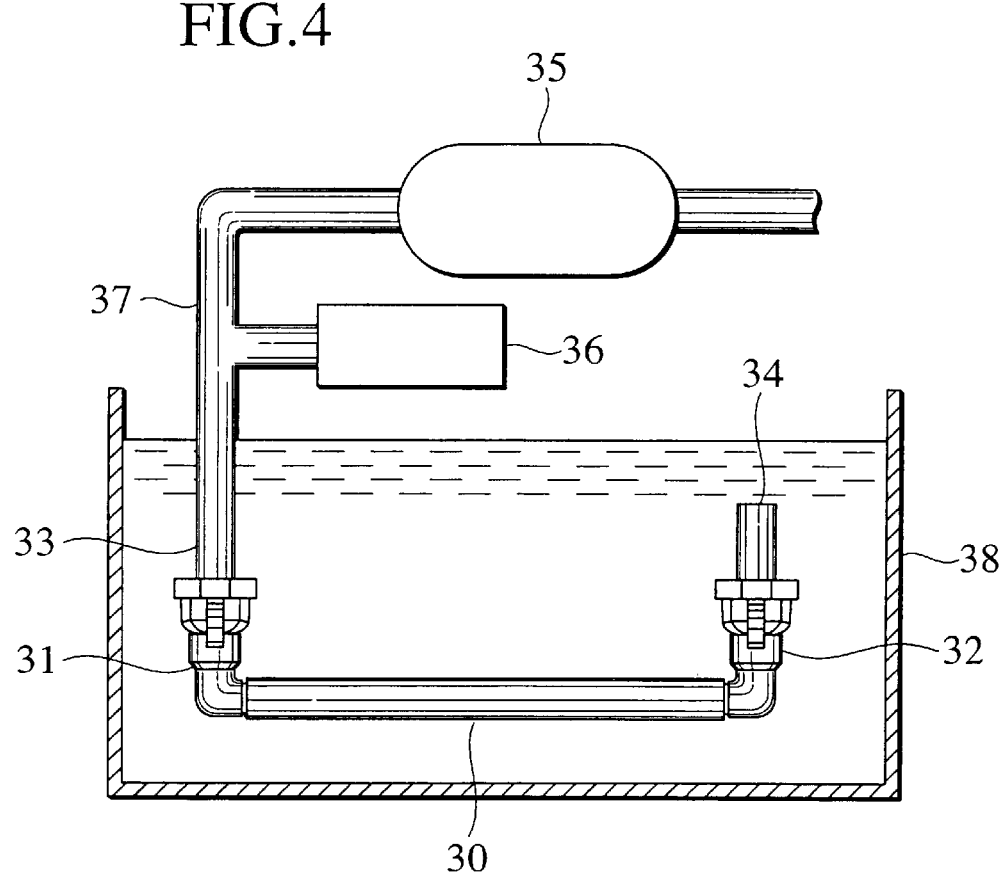
FIG. 4 shows an explanatory view illustrating a method of examining airtightness with a joint.

Airtightness with a joint was measured at room temperature in accordance with a method as illustrated in FIG. 4. Specifically, resin joints 31 and 32 are severally connected to both ends of a test tube 30, and the joints and the tube were subjected to a heat treatment at 180° C. for 1 hour. Thereafter, spigots 33 and 34 were severally inserted and connected to the joints 31 and 32. One of the spigots 34 has a closed end. Then, a pipe 37 including a regulator 35 and a pressure gauge 36 was connected to the other spigot 33 and then the tube was immersed into water in a tank 38. In this state, air was introduced by pressure through the pipe 37 so as to maintain pressure at 29 kPa for 30 seconds, and the tube was observed whether it caused bubbles or not.

(4) Dimensional Variation After Immersion into Fuel

Figure 5:
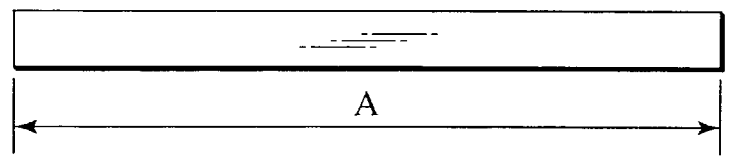
FIG. 5 shows an explanatory view illustrating a method of examining dimensional variation after immersion into fuel.

A test tube at a length of 160 mm was immersed into gasoline fuel (DM 15) containing 15% methanol at 60° C. for 72 hours. Thereafter, variation (%) of the length A as indicated in FIG. 5 was measured.

TABLE 1

| | Resin composite | Fabrication quality (N) | Bend R (mm) | Airtightness with a joint | Dimensional Variation after immersion into fuel (%) |
|---|---|---|---|---|---|
| Example 1 | Nyolon66 + Nylon6 + Plasticizer | 23.0 | 12.5 | Y | 0.4 |
| Comparative Example 1 | Nylon 11 | 14.2 | 10 | N | 3.3 |
| Comparative Example 2 | Nylon 612 | 21.5 | 12.5 | N | 1.0 |
| Comparative Example 3 | Nylon6 + Plasticizer | 22.5 | 16 | N | 0.1 |
| Comparative Example 4 | Nylon66 | 37.1 | 22.5 | Y | 0.7 |

Results of the examinations are shown in Table 1. Y in the column for the airtightness with a joint in Table 1 indicates that bubbles were not generated, and N therein indicates that bubbles were generated. The resin tube according to Example 1 showed satisfactory results regarding all perspectives of the fabrication quality, the bend R, the airtightness and the dimensional variation after immersion into fuel. By contrast, it is evident that: the resin tubes according to Comparative Examples 1 and 2 showed inferior results regarding the airtightness and the dimensional variation after immersion into fuel; the resin tube according to Comparative Example 3 showed inferior results regarding the bend R and the airtightness; and the resin tube according to Comparative Example 4 showed inferior results regarding the fabrication quality and the bend R.

The entire content of a Japanese Patent Application No. P2001-239778 with a filing date of Aug. 7, 2001 is incorporated herein by reference. Although the invention has been described above by reference to certain embodiments of the invention, the invention is not limited to the embodiments described above will occur to these skilled in the art, in light of the teachings. The scope of the invention is defined with reference to the following claims.

What is claimed is:

1. A resin tube for automotive piping, comprising:

Nylon 66 having a viscosity number within a range of 240–370 in a measurement of a 98% concentrated sulfuric acid solution at 25° C.;

Nylon 6 having a viscosity number within a range of 170–340 in the measurement; and a plasticizer, wherein the resin tube is made of a composite as a mixture thereof prepared with a proportion in a mass ratio of the Nylon 66:the Nylon 6:the plasticizer to be within a range of 100:5–50:3–20.

2. A resin tube for automotive piping according to claim 1, wherein the resin tube is made of a composite as a mixture thereof prepared with a proportion in a mass ratio of the Nylon 66:the Nylon 6:the plasticizer to be within a range of 100:10–40:5–10.

3. A resin tube for automotive piping according to claim 1, wherein the viscosity number of the Nylon 66 is within a range of 270–340.

4. A resin tube for automotive piping according to claim 1, wherein the resin tube is formed into a straight tube.

5. A resin tube for automotive piping according to claim 1, wherein the resin tube is formed into a bellows.

6. A resin tube for automotive piping according to claim 1, wherein the resin tube is formed into a multilayer tube in combination with other resin.

7. A resin tube for automotive piping according to claim 1, further comprising:

an additive for use in resin materials.

8. A method for fabricating a resin tube for automotive piping, comprising the steps of:

mixing Nylon 6 having viscosity number within a range of 170–340 in a measurement of a 98% concentrated sulfuric acid solution at 25° C., and a plasticizer;

preparing a resin composite by mixing the mixture of the Nylon 6 and the plasticizer with Nylon 66 having viscosity number within a range of 240–370 in the measurement; and forming the resin composite into a tube by extrusion molding.

* * * * *